(No Model.)
W. W. TRUE & E. C. BLANCHARD.
STRAINER.
No. 468,032. Patented Feb. 2, 1892.
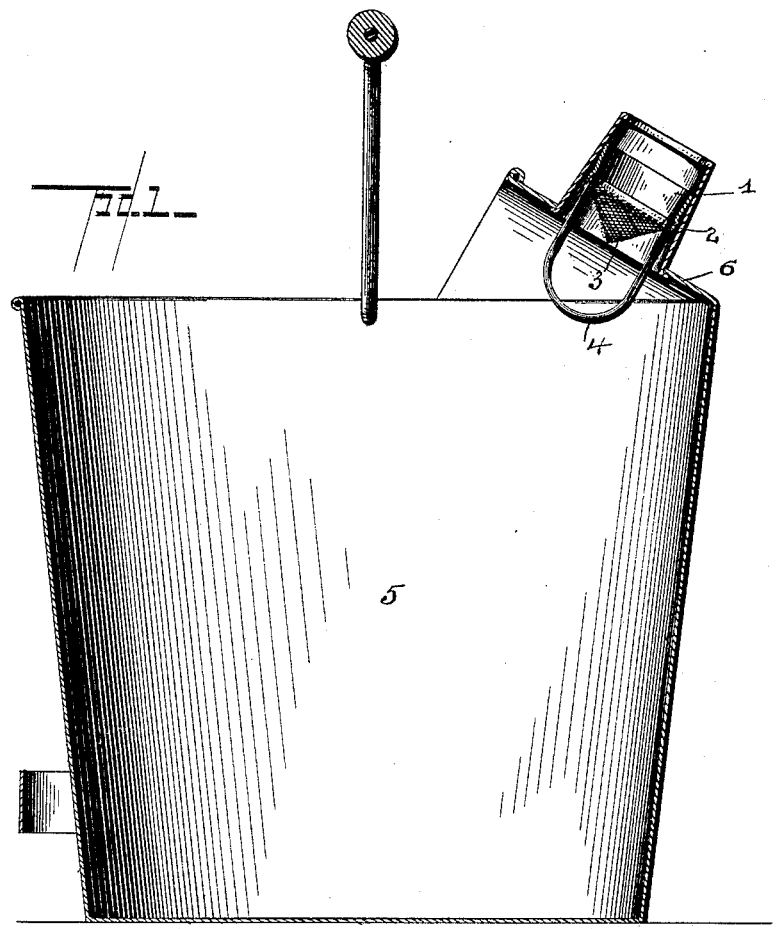
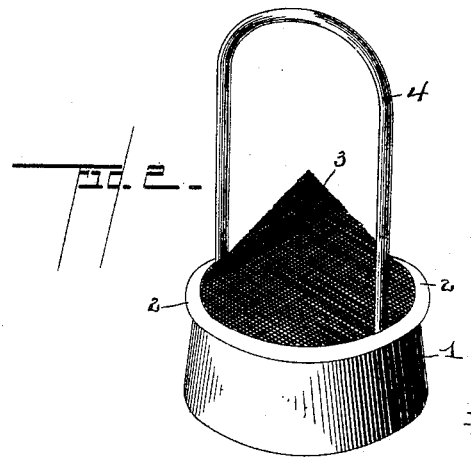
Witnesses:
Inventors
Willie Wallace True
Edwin Clarence Blanchard
By their Attorneys,
C. A. Snow & Co.

UNITED STATES PATENT OFFICE.

WILLIE WALLACE TRUE AND EDWIN C. BLANCHARD, OF NEWPORT, VERMONT.

STRAINER.

SPECIFICATION forming part of Letters Patent No. 468,032, dated February 2, 1892.

Application filed October 6, 1891. Serial No. 407,911. (No model.)

*To all whom it may concern:*

Be it known that we, WILLIE WALLACE TRUE and EDWIN C. BLANCHARD, citizens of the United States, residing at Newport, in the county of Orleans and State of Vermont, have invented a new and useful Strainer, of which the following is a specification.

This invention relates to improvements in strainers for use in connection with pails; and the objects in view are to provide a strainer that can be removably inserted in the spout of any ordinary pail and which is adapted to effectually strain the milk without permitting of the escape of any sediment or foreign bodies contained therein and which may be readily withdrawn for cleaning purposes and when so withdrawn be readily accessible without the removal of any parts thereof, so that an effectual cleaning is insured and no crevices are present in which matter may become deposited.

With the above objects in view the invention consists in certain features of construction hereinafter specified, and particularly pointed out in the claim.

Referring to the drawings, Figure 1 is a vertical longitudinal sectional view of a pail the spout of which has mounted therein a strainer constructed in accordance with our invention. Fig. 2 is a detail in perspective of the strainer.

Like numerals of reference indicate like parts in both the figures of the drawings.

In practicing our invention we employ a slightly-conical collar or ring 1, formed of sheet metal, swaging the same, as at 2, around the lower end or base of a conical strainer 3, the strainer and ring being soldered together and the apex of the strainer being coincident with the center of the collar or ring. From the upper or swaged end of the ring there rises an inverted-U-shaped bail or handle 4, which extends some distance from the strainer and can be readily grasped by the hand or finger for the purpose of withdrawing the strainer from its position.

5 designates an ordinary pail, from which projects the tapered spout 6, through which the liquid contained in the pail is discharged.

In operation the device is inverted and passed down through the mouth of the pail and inserted up into the spout, the inclined sides of the strainer taking frictional contact with the wall of the spout, whereby the strainer is held in position against any accidental displacement. Liquid being poured from the spout is thoroughly strained, and by reason of the conical shape given the strainer the force of the liquid does not tend to wash the sediment therethrough; but said sediment is deposited around the ring or between the ring and wall of the spout, where it collects. In order to cleanse the spout and the strainer, the latter is withdrawn, which may be readily accomplished by inserting the finger from the inside into the spout and engaging the U-shaped bail and subsequently withdrawing the finger with the strainer.

By immersing the strainer in water or subjecting the same to a flow of water the deposits collected thereon are readily washed away, as are also the deposits within the spout, so that, as will be apparent, we avoid the necessity of scraping the parts or picking deposits from angles and other points difficult of access.

It will be seen that when the conical strainer is removed it breaks the joint where the sediment collects and permits of the cleaning without the necessity of scraping. It will also be seen that the bail serves as a guard for the strainer and prevents it from being damaged.

Having described our invention, what we claim is—

The herein-described removable strainer, consisting of the conical ring open at both ends, the conical strainer secured to the upper end of the ring and closing the upper end thereof, and the bail secured to the opposite edges and at the upper end of the ring and encircling and protecting the strainer, substantially as specified.

In testimony that we claim the foregoing as our own we have hereto affixed our signatures in presence of two witnesses.

WILLIE WALLACE TRUE.
EDWIN C. BLANCHARD.

Witnesses:
M. P. RIORDAN,
P. J. FARRELL.